United States Patent
Ghiasi et al.

(10) Patent No.: US 8,171,319 B2
(45) Date of Patent: May 1, 2012

(54) MANAGING PROCESSOR POWER-PERFORMANCE STATES

(75) Inventors: Soraya Ghiasi, Boulder, CO (US); Malcolm S. Ware, Austin, TX (US); Karthick Rajamani, Austin, TX (US); Freeman L. Rawson, III, Austin, TX (US); Michael S. Floyd, Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/425,189

(22) Filed: Apr. 16, 2009

(65) Prior Publication Data

US 2010/0268968 A1    Oct. 21, 2010

(51) Int. Cl.
*G06F 1/32* (2006.01)
(52) U.S. Cl. .................. 713/321; 713/322; 713/323
(58) Field of Classification Search ............ 713/321–324
See application file for complete search history.

(56) References Cited

U.S. PATENT DOCUMENTS

| | | | |
|---|---|---|---|
| 6,519,707 B2 * | 2/2003 | Clark et al. ................... | 713/322 |
| 6,574,740 B1 | 6/2003 | Odaohhara et al. | |
| 6,938,176 B1 | 8/2005 | Alben et al. | |
| 7,017,060 B2 | 3/2006 | Therien et al. | |
| 7,100,037 B2 | 8/2006 | Cooper | |
| 7,137,017 B2 | 11/2006 | Itoh | |
| 7,191,349 B2 * | 3/2007 | Kaushik et al. ............... | 713/323 |
| 7,363,523 B2 | 4/2008 | Kurts et al. | |
| 7,464,276 B2 | 12/2008 | Rusu et al. | |
| 2002/0133729 A1 | 9/2002 | Therien et al. | |
| 2002/0138778 A1 | 9/2002 | Cole et al. | |
| 2006/0020765 A1 | 1/2006 | Mahrla et al. | |
| 2006/0036887 A1 | 2/2006 | Kardach et al. | |
| 2006/0218424 A1 | 9/2006 | Abramovici et al. | |
| 2007/0157045 A1 | 7/2007 | Gu et al. | |
| 2008/0028246 A1 | 1/2008 | Witham | |
| 2008/0098245 A1 | 4/2008 | Hogan et al. | |
| 2008/0104436 A1 | 5/2008 | Sawyers et al. | |
| 2008/0126815 A1 | 5/2008 | Cantwell et al. | |
| 2008/0201591 A1 | 8/2008 | Hu et al. | |
| 2008/0250260 A1 * | 10/2008 | Tomita ......................... | 713/324 |

* cited by examiner

*Primary Examiner* — Thuan Du
(74) *Attorney, Agent, or Firm* — Yudell Isidore Ng Russell PLLC

(57) ABSTRACT

Disclosed are systems, methods, and computer program products for managing power states in processors of a data processing system. In one embodiment, the invention is directed to a data processing system having dynamically configurable power-performance states ("pstates"). The data processing system includes a processor configured to operate at multiple states of frequency and voltage. The data processing system also has a power manager module configured to monitor operation of the data processing system. The data processing system further includes a pstates table having a plurality of pstate definitions, wherein each pstate definition includes a voltage value, a frequency value, and at least one unique pointer that indicates a transition from a given pstate to a different pstate. The voltage value, frequency value, and unique pointer of a given pstate definition are configurable, during operation of the data processing system, by the power manager module in response to changes in the operating parameters of the data processing system.

13 Claims, 4 Drawing Sheets

MANAGING PROCESSOR POWER-PERFORMANCE STATES

This invention was made with Government support under DARPA Phase III, HR0011-07-09-0002, THE GOVERNMENT HAS CERTAIN RIGHTS IN THIS INVENTION.

BACKGROUND

1. Technical Field

Embodiments of the invention disclosed generally relate to systems and associated methods for managing power consumption in a data processing system. In particular, embodiments of the invention are directed to the management of power consumption states in a data processing system.

2. Description of the Related Art

To use energy efficiently, a data processing system provides multiple operating modes at which the processors of the data processing system can operate. For example, a first operating mode can be set to provide the highest performance of the processors (that is, running the processors at the highest speed available), but such a first operating mode also results in the highest power consumption. A second operating mode can be configured to provide the highest energy conservation, but such a second operating mode also typically results in the lowest performance of the processors. Hence, multiple operating modes for power consumption management in a data processing system involve, generally, tradeoffs between power consumption and system performance.

In the relevant technical field, the above mentioned operating modes are often referred to as power states ("pstates"). During operation of a data processing system, significant energy savings can be obtained through a suitable selection of an appropriate p-state for a given task that the data processing system is executing. For example, when the task is computing intensive (such as 3D gaming), the processor can be put in a high performance pstate. However, when the task requires low computing support (such as intermittently editing a text file), the processor can be put in a low performance pstate. Choosing the wrong pstate for a given computing task can have deleterious implications for both energy savings and performance. By way of illustration, if a low performance pstate is selected when the computing task is 3D gaming, the system performance would very likely be unacceptable, as the speed of the processor would not be capable of keeping up with the demands of the gaming application. On the other side of the spectrum, if a high performance pstate is selected when the computing task is a simple word processing task, the data processing system would waste a significant amount of energy by running at a power level much higher than what is needed for the simple computing task.

In some data processing systems, selection of a pstate depends not only on the varying performance demands of the data processing system, but additionally, the temperature, voltage, and clock speed of the processors are also taken into account. Some data processing systems may base the pstate selection on the energy cost and time delay associated with transitioning from one pstate to another.

The inventive systems and method disclosed here provide alternative ways of managing the pstates in a data processing system.

SUMMARY OF ILLUSTRATIVE EMBODIMENTS

Disclosed are systems, methods, and computer program products for managing power states in processors of a data processing system. In one embodiment, the invention is directed to a data processing system having dynamically configurable power-performance states ("pstates"). The data processing system includes a processor configured to operate at multiple states of frequency and voltage. The data processing system also has a power manager module configured to monitor operation of the data processing system. The data processing system further includes a pstates table having a plurality of pstate definitions, wherein each pstate definition includes a voltage value, a frequency value, and at least one unique pointer that indicates a transition from a given pstate to a different pstate. The voltage value, frequency value, and unique pointer of a given pstate definition are configurable, during operation of the data processing system, by the power manager module in response to changes in the operating parameters of the data processing system.

Another aspect of the invention concerns a method of managing pstates in a processor of a data processing system. The method involves defining one or more pstates, each pstate associated with at least one voltage value and at least one frequency value. The method additionally includes providing a pstates table that associates a unique pointer with a respective one of the one or more p states. The method further involves monitoring the data processing system for changes in the operating conditions of the data processing system. The method also entails, in response to a change in the operating conditions, redefining at least one of the voltage value, frequency value, or unique pointer associated with a give pstate.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
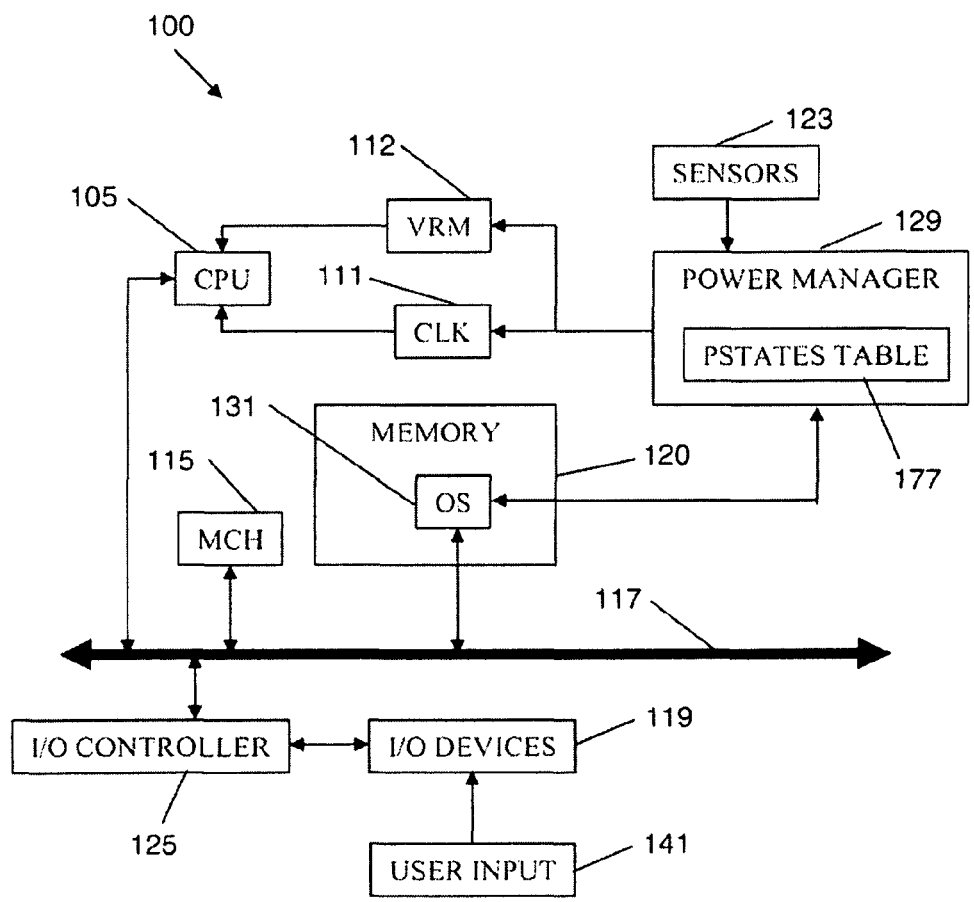
FIG. 1 is a high level schematic diagram of a data processing system in which inventive embodiments can be implemented.

Disclosed are systems, methods, and computer program products for managing power states in processors of a data processing system. In one embodiment, the invention is directed to a data processing system having dynamically configurable power-performance states ("pstates"). The data processing system includes a processor configured to operate at multiple states of frequency and voltage. The data processing system also has a power manager module configured to monitor operation of the data processing system. The data processing system further includes a pstates table having a plurality of pstate definitions, wherein each pstate definition includes a voltage value, a frequency value, and at least one unique pointer that indicates a transition from a given pstate to a different pstate. The voltage value, frequency value, and unique pointer of a given pstate definition are configurable, during operation of the data processing system, by the power manager module in response to changes in the operating parameters of the data processing system.

The embodiments described herein are described in the context of a microprocessor, but are not so limited. Although the following embodiments are described with reference to a processor, other embodiments are applicable to other integrated circuits or logic devices. The same techniques and teachings of the present invention can easily be applied to other types of circuits or semiconductor devices that can benefit from power savings.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figures. The specific reference numerals used are provided only to aid in the description and not meant to imply any limitations (structural or functional) on the invention. Unless otherwise explicitly stated, it is understood that the use of specific component, device, or parameter names are exemplary only and not meant to imply any limitations on the invention. The invention can be implemented with different terminology used to describe the components, devices, or parameters herein. Each term used herein is to be given its broadest interpretation given the context in which that term is used.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The term "pstate" will be used here to refer to a power-performance mode or state defined typically by a frequency value and a voltage value under which a processor is to operate for a given power consumption mode. In general, the pair of highest frequency value and highest voltage value defines the highest performance state of the processor, and conversely, the pair of lowest frequency value and lowest voltage value defines the lowest performance state of the processor. The highest performance state of the processor typically is also the highest power consumption state, while the lowest performance state of the processor usually is the lowest power consumption state. In certain embodiments, a pstate is defined by one or more frequency and voltage values, as well as information that indicates one or more pstates to transition to from the defined pstate.

FIG. 1 is a block diagram of an exemplary data processing system (DPS) 100 that can be used to implement certain inventive embodiments disclosed here for managing power states in a data processing system. Processor 105 is coupled to clock generator 111 and voltage regulator module (VRM) 112. Processor 105 is further coupled to memory control hub (MCH) 115 and input/output (I/O) control hub 125 over bus 117. Memory control hub 115 communicates with memory 120 over bus 117. DPS 100 includes power manager 129 configured to communicate with clock generator 111, VRM 112, and operating system (OS) 131. Sensors 123 provide input to power manager 129. Power manager 129 includes, or has access to, pstates table 177. As will be detailed below, pstates table 177 is configured to facilitate the management of pstates in DPS 100. DPS 100 also includes a power supply that can both source and sink current to the above mentioned components.

Memory 120 can be, for example, DRAM, flash memory, etc. DPS 100 can include additional volatile memory, such as cache memory, registers, and buffers. Memory 120 can also include non-volatile storage within which data, instructions, or computer code can be stored. I/O controller 125 provides connectivity and control for I/O devices 119, such as a mouse, keyboard, and display. A multimedia drive (for example, CDRW or DVD drive) and a universal serial bus (USB) hub can be coupled to I/O controller 125. The multimedia drive and the USB hub may operate as both input and output (storage) mechanisms. DPS 100 can receive user input 141 via I/O devices 119. In some embodiments, I/O controller 125 can include some of the functionality and/or components of power manager 129.

Processor 105 can be a microprocessor having one or more processing cores and at least one execution unit to process instructions. Processor 105 can be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example.

In some embodiments, processor 105 includes power management-related technology that provides adjustment of the voltage and/or frequency operating points of processor 105. In one embodiment, some of the functionality and/or components of power manager 129 can be included on the processor 105 to control transitions between voltage/frequency pairs. Available voltage/frequency pairs can include a minimum voltage/frequency pair corresponding to a minimum active mode operating voltage and a minimum operating frequency associated with the processor 105 for a fully functional operational mode. Similarly, a maximum operating voltage and frequency may be defined.

It should be noted that although DPS 100 is generally described as having a single processor 105, inventive embodiments disclosed here can be easily adapted to computing environments that use multiple processors.

Pstates table 177 can be computer logic (software, firmware, and/or one or more integrated circuits) configured to store pstate definitions and pstate transition information. Pstate table 177 can be an on- or off-chip register or another type of memory, and the pstate data may be loaded into the memory via software, basic input/output system (BIOS) code, operating system, other firmware and/or may be hard-coded, for example. Alternatively, a software look-up table including pstates and related data may be otherwise accessible by power manager 129. An exemplary pstate table 177 is described in additional detail below with reference to FIG. 2.

VRM 112 provides a supply voltage to processor 105. VRM 112 is coupled to receive signals from processor 105 and/or power manager 129. In one embodiment, VRM 112 provides a supply voltage to processor 105 in response to signals from processor 105 and/or power manager 129.

Memory control hub 115 may include both graphics and memory control capabilities. The graphics and memory control hub 115 and the I/O control hub 225 may be collectively referred to as the chipset. For other embodiments, chipset features may be partitioned in a different manner and/or may be implemented using a different number of integrated circuit chips. For example, for some embodiments, graphics and memory control capabilities may be provided using separate integrated circuit devices. Memory 120 stores OS 131, which includes code to support aspects of power management. OS 131 can be, for example, Microsoft Windows®, GNU®, Linux®, or Advanced Interactive eXecutive (AIX®). A different type of operating system-based power management may be used for other embodiments.

Power manager 129 may control aspects of the transitions between certain power management and/or normal operational states associated with processor 105, either autonomously or in response to OS 131 or other software or hardware events. For example, for certain processors, power manager 129 may at least partially control transitions pstates using one or more signals known in the relevant technology, such as a stop clock (STPCLK#), processor sleep (CPUSLP#), deep sleep (DPSLP#), deeper stop (DPRSTP#), and/or stop processor (STPCPU#). For processors that support different power management and/or normal operational states, power manager 129 may control transitions between two or more different power management and/or normal operational states using one or more signals that may be similar to or different from those previously mentioned.

In one embodiment, sensors 123 and power manager 129 reside in processor 105. Sensors 123 may monitor the total power consumption of the chip and can trigger a voltage/frequency adjustment if needed. Sensors 123 may reside on the die or on the processor module. Alternate embodiments of power manager 129 can also be used in microcontrollers, embedded processors, graphics devices, DSPs, and other types of logic circuits.

In a multiprocessor environment, each processor 105 can be provided with the capability to control its own voltage and frequency operating points through on-die sensors 123 and power manager 129. In one embodiment, sensors 123 monitor the power consumption of processor 105 and send values to power manager 129. Sensors 123 can measure the current consumption of processor 105 or the temperature of the chip. In one implementation, power manager 129 calculates the power consumption based on the present operating voltage and current. In another embodiment, sensors 123 can monitor the processor compute load or activity by monitoring the instructions entering the processor execution pipeline. Power manager 129 can also receive input from sensors external to processor 105.

One implementation of a frequency/voltage adjusting power dissipation mechanism can be used with a system on a chip. One embodiment of a system on a chip comprises of a processor and a memory. The memory for one such system can be a flash memory. The flash memory can be located on the same die as the processor and other system components. Additionally, other logic blocks such as a memory controller or graphics controller can also be located on a system on a chip. By including one embodiment of the present invention on the system on a chip, power manager 129 can adjust the processor frequency and voltage to minimize power dissipation.

It should be noted that while power manager 129 and pstates table 177 have been illustrated in FIG. 1 as components of DPS 100 that are separate from processor 105, memory controller 115, I/O controller 125, and OS 131, at least some of the functionality of power manger 129 and pstates table 177 can be shared by, located in, or implemented by, one or more of processor 105, memory controller 115, I/O controller 125, and OS 131. In one embodiment, OS 131 may be configured to execute a power management policy, but power manager 129 may be configured to override or ignore any pstate changes requested by OS 131. In some implementations, power manager 129 (including pstates table 177) and sensors 123 are part of processor 105; that is, at least some of the functionality of power manager 129 and pstates table 177 are implemented as circuitry and/or firmware that shares the same chip or IC board as the execution unit of processor 105.

In one implementation, describing generally the management of pstates in DPS 100, power manager 129 accesses, receives, and/or facilitate creation of pstates table 177. During operation of DPS 100, power manager 129 can redefine pstates contained in pstates table 177 in response to, for example, changes in the operating condition of and/or constraints associated with DPS 100. In response to user input 141, OS 131 requests, and/or power management policy based on inputs from sensors 123, power manager 129 determines that DPS 100 is to be transitioned from a current operating pstate to a different operating pstate. Power manager 129 then provides inputs or instructions to CLK 111 and VRM 112 to adjust the operating frequency and/or voltage(s) of processor 105 based on frequency, voltage, and pstate transition pointers included in pstates table 177.

In one embodiment, software code provided by power manager 129 is software code for: (a) defining one or more pstates, which collection of pstates can be stored in a pstates table; (b) monitoring operating parameters of DPS 100, whereby constraints on operation of DPS 100 are received and enforced; (c) redefining one or more of the pstates in response to changes in the operating parameters of DPS 100; (d) monitoring the activity level of DPS 100; (e) and, in response to a change of activity level of DPS 100 or a request from a component of DPS 100, transitioning DPS 100 from one pstate to another by using pstate transition information stored in the pstates table. Depending on the specific embodiment, power manager 129 can include some or all of the listed code functions (a)-(e).

Figure 2:
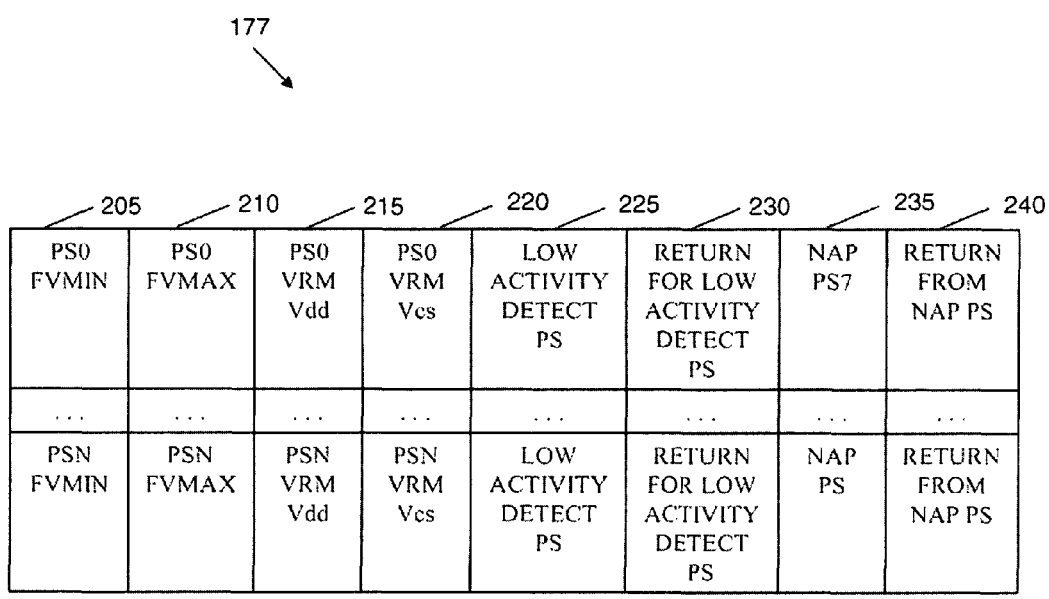
FIG. 2 is a block, schematic diagram of table of power-performance states ("pstates") that can be used with the data processing system of FIG. 1.

FIG. 2 illustrates an exemplary pstates table 177. Each row of pstates table 177 defines a pstate and provides information that power manager 129 can use to transition from one pstate into another pstate. Pstates table 177 can include a plurality of pstates, from a pstate named PS0 to a pstate named PSN, for example. In one embodiment, each pstate is defined by minimum frequency (FVMIN) 205 and maximum frequency (FVMAX) 210, as well as voltage value for a first voltage domain (VRM Vdd) 215 and a second voltage value (VRM Vcs) 220 for a second voltage domain. In some embodiments, a pstate is defined by a single frequency value and a single voltage value. In other embodiments, such as the one illustrated in FIG. 2, a pstate can be defined by at least two frequency values and two voltage values. Pstates table 177 allows power manager 129, and/or other computer logic of DPS 100 or processor 105, to select an operating frequency between FVMIN 205 and FVMAX 210 depending on observed operating characteristics of processor 105. This allows power manager 129 to modify the operating frequency of processor 105 while keeping the operating voltage within a given voltage domain. In some processor 105 architectures, two voltage planes VRM Vdd and VRM Vcs can be provided. In some implementations, certain components of processor 105 are provided with VRM Vdd, while other components of processor 105 are provided with VRM Vcs. Hence, a pstate definition can include not just one voltage value, but may include voltage values for VRM Vdd and VRM Vcs.

In some embodiments, pstates table 177 also includes unique pointers that power manager 129 can use to determine to which state to transition from a given current operating pstate. For example, for pstate PS0 of the first row of pstates table 177, low activity detect (LAD) pstate pointer 225 indicates to which state to transition from PS0 upon power manager 129 detecting that DPS 100, or processor 105, has entered a period of low activity. Pstates table 177 can also include a unique pointer return for low activity detect (RLAD) pstate 230 that indicates to which pstate to transition to when processor 105 is exiting from a low activity level. In one embodiment, pstates table 177 can be additionally provided with other unique pstate transition points. Hence, pstates table 177 may include a NAP pstate pointer (NAP) 235, which power manager 129 can use to transition from PS0 to PS7, for example. Pstates table 177 can also include a unique pointer return from NAP state (RNAP) 240 that indicates to which state to transition to when processor 105 is exiting from a NAP pstate. In some implementations, LAD pstate 225 is motivated by a hardware action. In one embodiment, NAP pstate 235 is motivated by software action. LAD pstate 225 and NAP pstate 235 may or may not correspond to the same activity level of processor 105 and/or DPS 100. Of course, pstates table 177 can includes additional similar pointers to other defined pstates.

Figure 3:
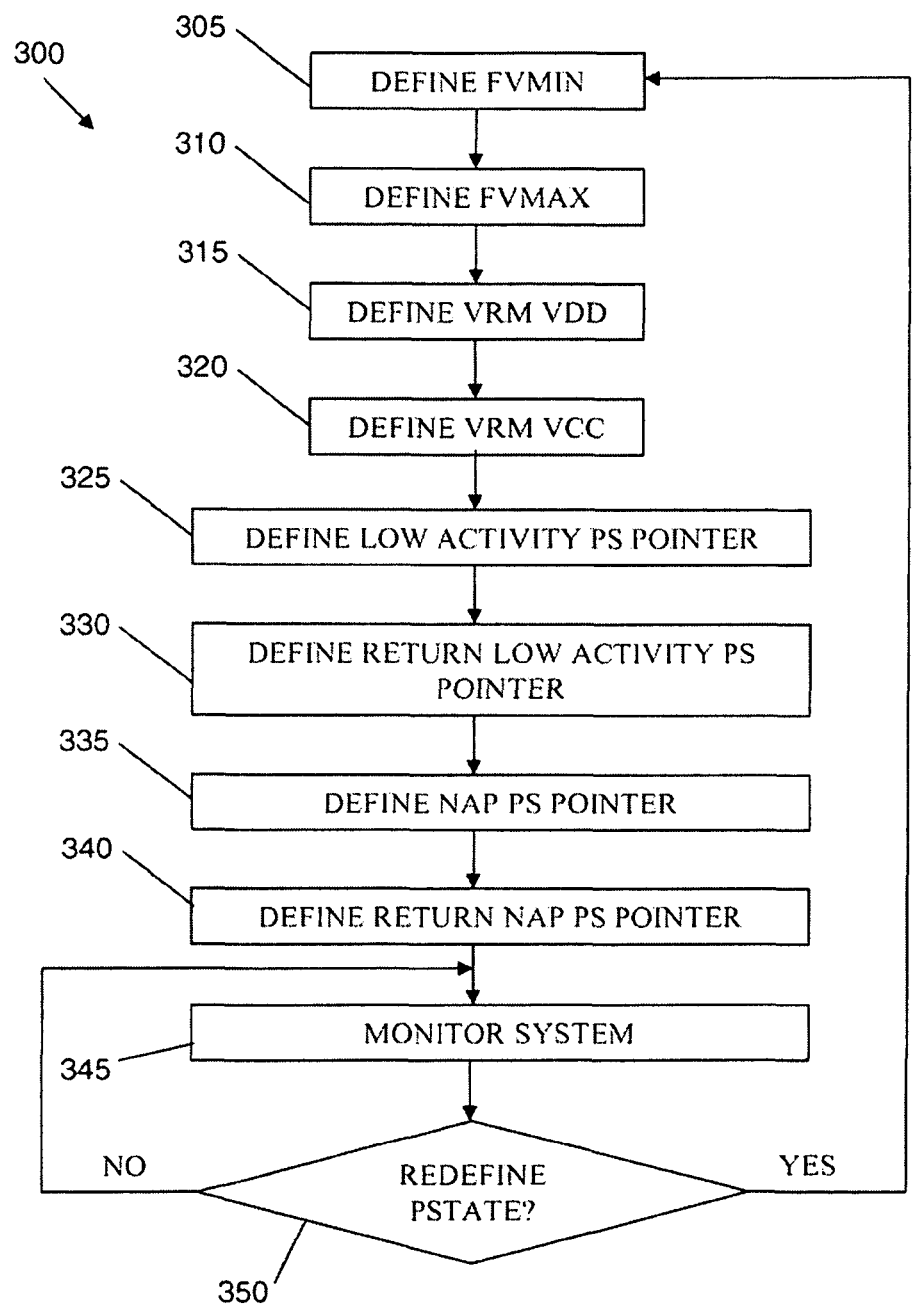
FIG. 3 is a flow chart of a process to create and manage the pstates table of FIG. 2.

With reference to FIG. 3 now, a method 300 of creating and managing pstates table 177 will be described. In one embodiment, power manager 129 populates pstates table 177 through user input 141 and/or accessing a memory of DPS 100, which memory can be part of memory 120 or be a storage structure included with processor 105, for example. For each pstate to be included in pstates table 177, power manager 129 receives an initial or default value for FVMIN 205 (305), FVMAX 210 (310), VRM Vdd 215 (315), VRM Vcs 220 (320), LAD 225 (325), RLAD 230 (330), NAP 235 (335), and RNAP 240 (340). Thus, in one embodiment of method 300, pstates table 177 is created through following steps 305-340 for each pstate to be included in pstates table 177.

During operation of DPS 100, power manager 129 (for example) may redefine any of the values and/or pointers defined in steps 305-340 of method 300. In one embodiment, power manager 129 monitors DPS 100 for changes in operating conditions and or parameters (345). For example, power manager 129 may receive user input 141 via OS 131 with a request to redefine PS0, such as redefining FVMIN 205, FMAX 210, VRM Vdd 215, VRM Vcs 220, LAD 225, RLAD 230, NAP 235, and/or RNAP 240. In other instances, power manager 129 may detect a change in power capacity allocated to processor 105. To address such an instance, power manager 129 may be configured to redefine one or more parameters of one or more of the pstates PS0-PSN of pstates table 177. By way of another example, a physical power limitation or constraint may be enforced by power manager 129. Hence, if one or more pstates requested by OS 131 are causing DPS 100 and/or processor 105 to approach the power (or, for example, thermal) constraint to an undesirable level, power manager 129 can re-define the frequency and/or voltage values associated with a given pstate such that the power or thermal constraints can be observed at the same time that the requests of the OS 131 for a given pstate can be granted. It should be noted that the use of pstates table 177 facilitates a very flexible management of the power consumption of DPS 100 because each pstate of pstates table 177 is configurable (i.e., re-definable) during operation of DPS 100. In other words, each pstate of pstates table 177 is not necessarily static but, rather, can be redefined during operation of DPS 100 as the operating conditions of DPS 100 may require.

At a decision step 350, power manager 129 determines whether the operating parameters or condition of DPS 100 have changed such that a redefinition of one or more of the pstates of pstates table 177 is to be performed. If such redefinition is to be done, power manager 129 returns to any one of steps 305-340 to perform the redefinition. If a redefinition is not to be done, power manager 129 continues monitoring DPS 100 as described above. When determining whether a redefinition of a pstate is to be done, power manager 129 may evaluate, or act in response to, changes in power allocation capacity for processor 105 or any other components of DPS 100. Additionally, power manager 129 may receive inputs via sensors 123, which inputs can include (for example) values associated with the thermal envelope of processor 105 and/or any other components of DPS 100. The inputs provided by sensors 123 can also include information about the load demand and/or power consumption in processor 105 and/or any other components of DPS 100. In some embodiments, power manager 129 modifies pstates table 177 in response to constraints provided by a power bus (not shown), firmware (not shown), or OS 131 of DPS 100. In one implementation, power manager 129 modifies pstates table 177 in response to, or by taking into account, a power management policy governed by OS 131.

Figure 4:
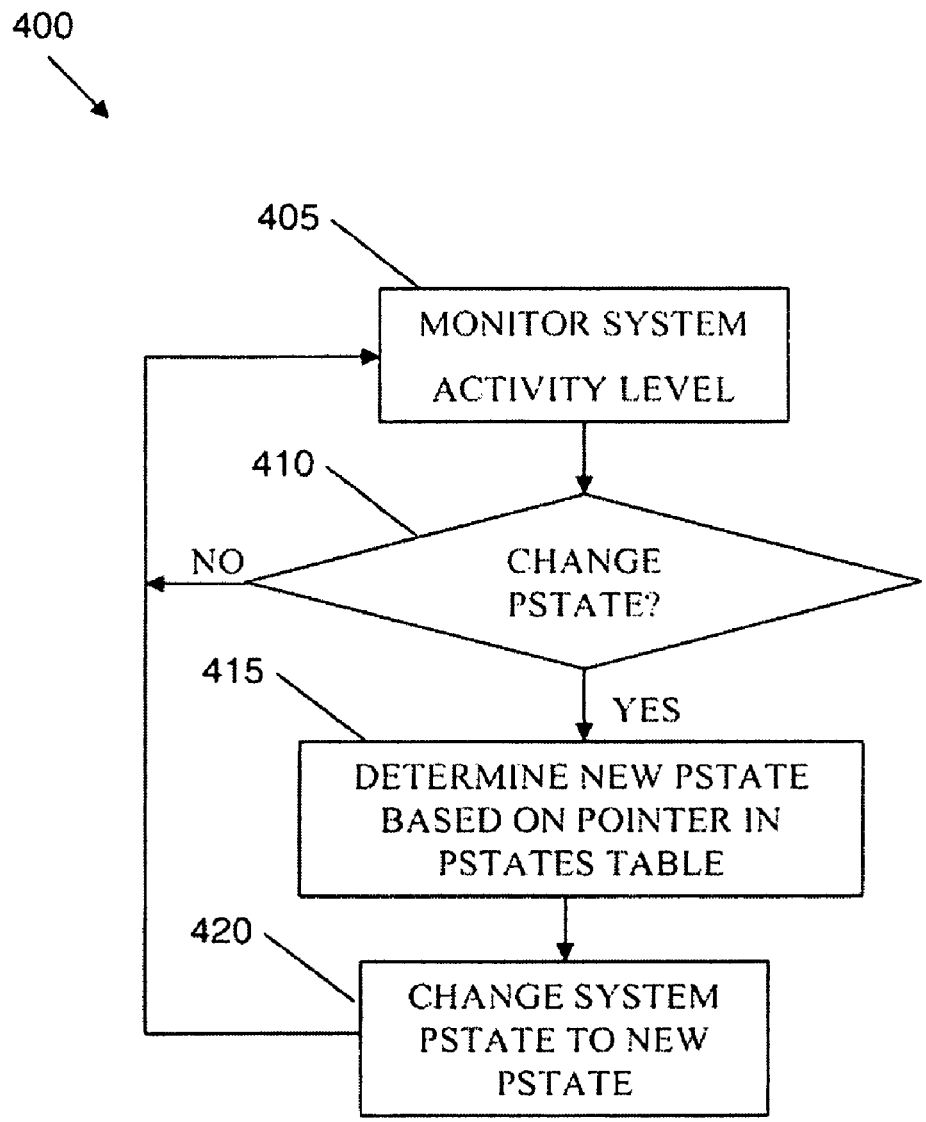
FIG. 4 is a flow chart of process to transition a data processing system from one pstate to another pstate using the pstates table of FIG. 2.

Referencing FIG. 4 now, a method 400 of managing pstates in DPS 100 will be described. In one embodiment, power manager 129 monitors (405) the activity level of DPS 100. In other embodiments, OS 131 also monitors the activity level of DPS 100; in yet another embodiment, the activity level of DPS 100 is monitored jointly and/or concurrently by OS 131 and power manager 129. At a decision step 410, power manager 129 determines whether DPS 100 is to be transitioned from a current pstate to a different pstate. Power manager 129 may determine that a pstate change is to be made if, for example, the activity level, temperature, or other operating parameters of DPS 100 change. Power manager 129 may also determine that a pstate change is to be made when OS 131 makes a pstate change request and power manager 129 determines that the OS 131 request can be granted within the current constraints imposed on the DPS 100 through the pstates table 177. If a pstate change is not to be made, power manager 129 returns to step 405 to continue monitoring the system activity level.

If power manager 129 determines that a pstate change is to be made, power manager 129 determines a transition to a new pstate by accessing pstates table 177. In one exemplary embodiment, power manager 129 accesses pstate table 177 and determines the pstate to transition to based on the pointers associated with the current pstate (415). Thus, in one example, when DPS 100 is in pstate PS0, and if power manager 129 detects a low activity level, power manager 129 uses LAD state pointer 225 to transition to the pstate indicated by the LAD state pointer 225, which may point to a lower pstate such as PS5. Power manager 129 then changes the frequency and/or voltage at which DPS 100 operates (420) to ensure conformance with the pstate defined by the pstate to which the transition is to be made.

It should be noted that method 300 is generally directed to the creation and management or modification of pstates table 177, while method 400 is generally directed to the use of pstates table 177 in facilitating the transitioning of DPS 100 from one pstate to another pstate.

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Although certain inventive embodiments have been described in the context of a data processing system having a general architecture related to typical computer systems, the inventive embodiments are not limited to computer systems. Alternative inventive embodiments can be used in devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which use a mechanism for managing power use.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A data processing system having configurable power states, the data processing system comprising:
   a processor configured to operate at multiple states of frequency and voltage;
   a power manager module configured to monitor the data processing system;
   a power states table having a plurality of power state definitions, wherein each power state definition includes a first voltage value, a first frequency value, and a first pointer that indicates a transition from a given power state to a different power state; and
   wherein the first voltage value, first frequency value, and first pointer of a given power state definition are configurable, during operation of the data processing system, by the power manager module in response to changes in the operating parameters of the data processing system.

2. The data processing system of claim 1, wherein:
   each power state definition further includes a second frequency value;
   the first frequency value corresponds to a minimum operating frequency of the processor while in a power state defined by the power state definition; and
   the second frequency value corresponds to a maximum operating frequency of the processor while in the power state defined by the power state definition.

3. The data processing system of claim 2, wherein:
   the transition is a first transition; and
   each power state definition further includes a second pointer that indicates a second transition from a power state defined by that power state definition to another power state defined by another of the plurality of power state definitions.

4. The data processing system of claim 1, wherein:
   each of the plurality of power state definitions defines a respective one of a plurality of different power states for the processor;
   the processor is configured to operate in any of the plurality of different power states;
   the power manager module is configured to transition the processor during operation of the data processing system between different ones of the plurality of different power states defined by the power states table by reference to transitions specified by the plurality of power state definitions.

5. The data processing system of claim 1, wherein:
   each of the plurality of power state definitions further includes a second voltage value;
   the first voltage value corresponds to a first voltage domain and the second voltage value corresponds to a second voltage domain; and
   the first and second voltage domains are associated with different components of the processor.

6. A method of managing power states of a processor of a data processing system, the method comprising:

storing, in data storage of the data processing system, a plurality of power state definitions each associated with a respective one of a plurality of power states of the processor, wherein each power state definition includes a first voltage value for the processor, a first frequency value for the processor, and a first pointer that indicates a transition from a power state defined by that power state definition to another of the plurality of power states;

during operation of the data processing system, transitioning the processor between different ones of the plurality of power states defined by the plurality of power state definitions by reference to transitions specified by the plurality of power state definitions;

monitoring operating conditions of the data processing system; and in response to detecting a change in the operating conditions during operation of the data processing system, redefining a given power state definition among the plurality of power state definitions by modifying at least one of the first voltage value, first frequency value, and first pointer of the given power state definition.

7. The method of claim 6, wherein:

each power state definition further includes a second frequency value;

the first frequency value corresponds to a minimum operating frequency of the processor while in a power state among the plurality of power states defined by the power state definition; and the second frequency value corresponds to a maximum operating frequency of the processor while in the power state defined by the power state definition.

8. The method of claim 7, wherein:

the transition is a first transition; and each power state is further includes a second pointer that indicates a second transition from a power state defined by that power state definition to another power state defined by another of the plurality of power state definitions.

9. The method of claim 6, wherein:

each of the plurality of power state definitions further includes a second voltage value;

the first voltage value corresponds to a first voltage domain and the second voltage value corresponds to a second voltage domain; and the first and second voltage domains are associated with different components of the processor.

10. A computer program product, comprising:

a computer-readable storage medium;

instructions stored on the computer-readable storage medium and executable by a data processing system to store, in data storage of the data processing system, a plurality of power state definitions each associated with a respective one of a plurality of power states of the processor, wherein each power state definition includes a first voltage value for the processor, a first frequency value for the processor, and a first pointer that indicates a transition from a power state defined by that power state definition to another of the plurality of power states;

instructions stored on the computer-readable storage medium and executable by the data processing system to transition the processor during operation of the data processing system between different ones of the plurality of power states defined by the plurality of power state definitions by reference to transitions specified by the plurality of power state definitions;

instructions stored on the computer-readable storage medium and executable by the data processing system to, in response to detecting a change in the operating conditions during operation of the data processing system, redefine a given power state definition among the plurality of power state definitions by modifying at least one of the first voltage value, first frequency value, and first pointer of the given power state definition.

11. The computer program product of claim 10, wherein:

each power state is further associated with a second frequency value;

the first frequency value corresponds to a minimum operating frequency of the processor while in a power state defined by the power state definition; and the second frequency value corresponds to a maximum operating frequency of the processor while in the power state defined by the power state definition.

12. The computer program product of claim 11, wherein:

the transition is a first transition; and each power state is further associated with a second pointer that indicates a second transition from a power state defined by that power state definition to another power state defined by another of the plurality of power state definitions.

13. The computer program product of claim 10, wherein:

each of the plurality of power state definitions further includes a second voltage value;

the first voltage value corresponds to a first voltage domain and the second voltage value corresponds to a second voltage domain; and the first and second voltage domains are associated with different components of the processor.

* * * * *